United States Patent [19]

Kido et al.

[11] 4,095,674
[45] Jun. 20, 1978

[54] LOW PRESSURE AUTOMATIC LUBRICATION SYSTEM

[75] Inventors: Tadao Kido; Yoshihiko Satou, both of Katsuta; Kou Tayama, Niiza, all of Japan

[73] Assignees: Hitachi, Ltd.; Hitachi Elevator and Service Co., Ltd.; Nanshin Kikoh Company, Limited, all of Japan

[21] Appl. No.: 680,857

[22] Filed: Apr. 27, 1976

[30] Foreign Application Priority Data

Apr. 30, 1975  Japan ................................ 50-51409

[51] Int. Cl.² .............................................. F01M 9/00
[52] U.S. Cl. ................................... 184/6.1; 184/6.28; 184/15 A; 239/601
[58] Field of Search .................. 184/6, 6.1, 6.11, 6.28, 184/15 R, 15 B, 15 A; 239/601, 589; 222/566, 575

[56] References Cited

U.S. PATENT DOCUMENTS

| 2,263,073 | 11/1941 | Duckstein | 184/6 |
| 2,546,211 | 3/1951 | Blackburn | 184/15 R |
| 2,579,202 | 12/1951 | Piccoli | 222/575 |
| 3,116,810 | 1/1964 | Olson | 184/15 B |
| 3,231,046 | 1/1966 | Ohrnberger | 184/6.28 |
| 3,463,268 | 8/1969 | Krause | 184/6.1 |

*Primary Examiner*—Samuel Feinberg
*Attorney, Agent, or Firm*—Craig & Antonelli

[57] ABSTRACT

A low pressure lubrication or oiling system including: a pump; a nozzle having a circular end face and a discharge orifice having one end of the orifice being open to the circular end face with oil pumped by the pump being supplied through the orifice to a plurality of operating members which require lubrication, and a flow control valve positioned between the pump and the nozzle. The diameter of the orifice ranges from 0.3 mm to 0.8 mm with the outer diameter of the circular end face being at least two times as large as the diameter of the orifice, and the length of the orifice being at least six times as large as the diameter of the orifice so that a small amount of oil may be dropped in the form of a continuous line at a feeding rate of 3 to 20 cc / min.

14 Claims, 10 Drawing Figures

LOW PRESSURE AUTOMATIC LUBRICATION SYSTEM

BACKGROUND OF THE INVENTION

1. Field of the Invention

This invention relates to an automatic lubrication or oiling system for use with a power transmission chain and the like, and more particularly to an automatic lubrication system which is best suited for feeding a small amount of oil.

2. Brief Description of the Prior Art

It is well known that suitable lubrication is required for power transmission chains for use with a conveyor or an escalator, wire ropes such as cables, gears, and the surfaces of sliding motion such as machine tools hereinafter referred to as operating bodies for the purpose of preventing wear in such operating bodies.

To describe the situation in more detail, let us take a power transmission chain. The life of these chains depends on a wear of chain joints; thus, they should be protected against dirt and moisture which assists chain wear, and required suitable lubrication be applied to chain joints. On the other hand, the prior art low pressure automatic lubrication systems are generally classified into three types, one being a drip feed type in which lubricating oil is supplied intermittently in the form of droplets applied to points to be lubricated. Another type is an "oil-mist" or injection spray type system wherein the lubricating oil is sprayed or injected in the form of a mist on the points to be lubricated. The third type system is a so-called "continuous oil feeding" type in which lubricating oil is continuously fed in the form of a stream toward points to be lubricated. Any of these types of lubricating systems have inherent disadvantages and are not suitable as a lubricating apparatus for use in lubricating, for example, a power transmission train.

More particularly, the "drip-feed" type has a disadvantage that it is difficult to coincide with good timing the droplets discharged from a nozzle with the link points on the power transmission train so that a considerable variation in lubrication will occur at each link joint. The "oil-mist" or injection-spray type system has the disadvantage that, although no variation in lubrication at each link joint occurs, if used in a power chain transmission system, the lubricating oil is dispersed on areas other than the area to be lubricated, thereby contaminating the environmental surroundings.

Furthermore, the "continuous oil feeding" type lubricating system has the disadvantage that, since the discharge rate of the lubricating oil is relatively high, for example, more than 100 cc/min, excessive lubrication occurs so that almost all of the lubricating oil flows downwardly past the points to be lubricated, thereby contaminating the environmental surroundings in a manner similar to the "oil-mist" type lubrication system.

Additionally, in the "continuous oil feeding" type lubricating system, there are basically two types of systems, with the first being a system where the lubricating oil is continuously directed downwardly for a predetermined period of time to lubricate points to be lubricated, with the other type of system being constructed so that the lubricating oil is applied on the points to be lubricated at the proper time in response to a motion of the member to be lubricated. In these last-mentioned types of systems, excessive lubrication will nevertheless occur even if the lubricating oil is fed at a proper time to make short the period of time during which the lubrication is to be carried out, because the discharge rate of the lubricating oil from the nozzle is more than 100 cc/min. As a counter-measure to the excessive lubrication, it has been proposed to dispose an oil pan below the power transmission trains; however, such proposal is disadvantageous in that a space for such oil pan is required and, if there is no space available, it is not possible to dispose the oil pan below the power transmission chains. Additionally, by the provision of an oil pan, it would be necessary to take appropriate steps to provide for drainage of such oil pan, thereby requiring additional labor and maintenance expenses.

For these reasons, lubrication for operating bodies in general has been effected by a "brush" type lubrication by an operator. However, a disadvantage of such lubrication resides in the fact that considerable time and effort is involved in addition to exposing operators, to unnecessary dangers.

SUMMARY OF THE INVENTION

It is an object of the present invention to provide a low pressure automatic lubrication system which permits dropping of a small amount of oil in the form of a continuous line at a feeding rate of 3 to 20 cc/min.

It is another object of the present invention to provide a low pressure automatic lubrication system, in which an oil feeding rate ranges from 5 to 10 cc/min, and an oil feeding pressure ranges from 3 to 15 kg/cm$^2$, preferably.

According to the present invention, there is provided a low pressure automatic lubrication system of the type which feeds oil to at least one operating body at a low pressure for lubrication, comprising: a pump; nozzle means having a circular end face and including an orifice, one end of said orifice being open to said circular end face, oil pumped by said pump being fed through said orifice to the operating body; and control means positioned between the pump and the nozzle means for controlling the flow of oil from the pump to the nozzle means; said orifice having a diameter $d_1$ and a length $l_1$, and said circular end face of the nozzle means having an outer diameter $d_2$, wherein $d_1 = 0.3$ mm to 0.8 mm, $d_2 \leq 2d_1$, and $l_1 \leq 6 d_1$.

DETAILED DESCRIPTION OF THE PREFERRED EMBODIMENT

Figure 1:
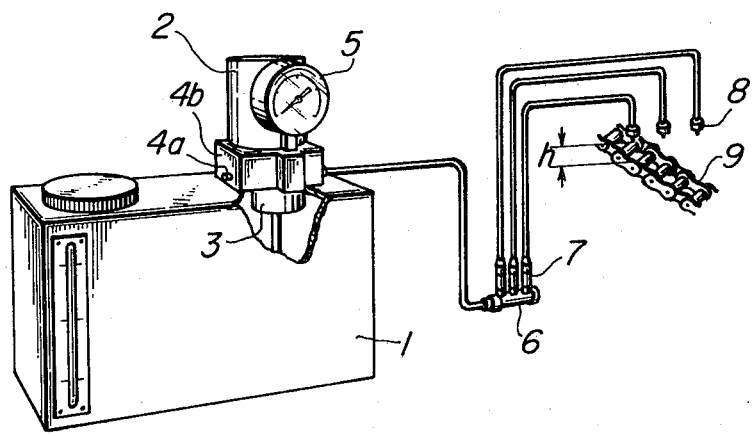
FIG. 1 is a perspective view of a low pressure automatic lubrication system according to the present invention.

These and other objects and features of the present invention will be apparent from the following description when taken in conjunction with the accompanying drawings. As can be seen from FIGS. 1 and 2, oil in an oil tank 1 is pumped under pressure by means of a pump 3 which is operated by a motor 2. An oil pressure of the oil thus being fed under pressure is indicated at a pressure gauge 5 which is adjusted by a control screw 4a of a relief valve 4 housed within a housing 4b positioned between the motor 2 and the pump 3. The oil whose pressure is adjusted by means of the relief valve 4 is then fed to a distributor 6, where an oil flow is divided into flows of a number corresponding to the number of lubricating points required, while the flow rate of oil is controlled by means of a flow control valve 7, and then the oil is fed through a nozzle 8 to an operating body 9. In this respect, it is preferable that a flow control valve 7 permit the control for the discharge rate of a small amount of oil (5 to 10 cc/min) in a manner that the flow rate of oil may be varied in proportion to the variation in oil pressure. In this sense, the flow control valve 7 which utilizes an orifice is best suited for such a purpose. The adoption of the flow control valve of this type permits the simultaneous adjustment of the feeding rate of oil for a plurality of flow control valves by adjusting the relief valve 4 on the side of the pump 3, even if many flow control valves 7 are employed.

However, the mere use of the flow control valve 7 which controls the flow rate of oil on the order of 5 to 10 cc/min leads to dripping of oil being fed, thus making no difference from the prior art automatic drip-feed type lubrication system. In other words, there arises a need to provide a nozzle 8 of a special arrangement which will be described below.

Figure 3:
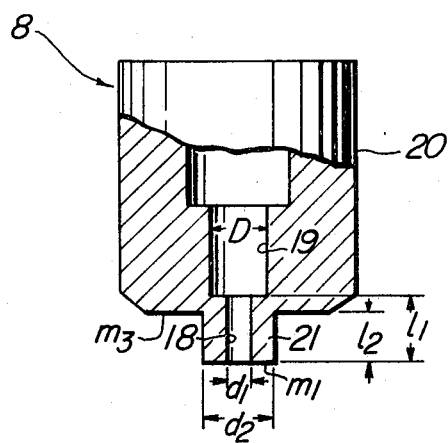
FIG. 3 is a view, partly in cross section, of a nozzle.

Referring to FIG. 3, there is shown a configuration of the nozzle 8. The nozzle 8 has a circular end face $m_1$, an orifice 18 one end of which is open to the circular end face $m_1$, and a passage 19 leading to the other end of the orifice 18. More specifically, the nozzle 8 includes a body portion 20, a shoulder portion $m_3$, and a head portion 21, while the orifice extends through the head portion 21 and a part of the body portion 20, with one end of orifice 18 being open to the end face $m_1$ of the head 21, and with the other end of the orifice being connected to the passage 19 defined in the body portion 20.

Assume the diameter $d_1$ and the length $l_1$ of the orifice, the outer diameter $d_2$ of the circular end face $m_1$ of the head 21, and the length $l_2$ of the outer periphery of the head as measured from the circular end face $m_1$ of the head to the shoulder portion $m_3$. Tests reveal that the diameter $d_1$ of the orifice should be minimized for achieving dropping of oil in the form of a continuous line at a low feeding rate on the order of 5 to 10 cc/min. Thus, it is preferable that $d_1$ = 0.3 to 0.8 mm. In addition, if the length $l_1$ of the orifice is excessive, then there results dripping of oil in the form of droplets. Thus, the relationship $l_1 \leq 6d_1$ should be maintained, as the aforesaid tests reveal. Furthermore, excessive outer diameter $d_2$ of the circular end face $m_2$ results in the formation of droplets on the end face $m_1$, with the result that the droplets thus formed will drip therefrom. As a result, it was found that the relationship $d_2 \leq 2d_1$ should be maintained to this end. More particularly, if the configuration of the nozzle 8 is subject to the aforesaid limitation, i.e., $d_1$ = 0.3 to 0.8 mm, $d_2 \leq 2d_1$, and $l_1 \leq 6d_1$, then there may be achieved a low feeding rate of oil which drops in the form of a continuous line, such as for instance, a feeding rate on the order of 5 to 10 cc/min. Meanwhile, even if the aforesaid limitation is not followed, then there may possibly be obtained a feeding rate of oil of 5 to 10 cc/min. However, the manner of oil being fed will be of a drip-feed type, thus failing to achieve the intended purpose described earlier.

According to the aforesaid embodiment, there may be achieved feeding of oil which drops in the form of a continuous line at a feeding or discharge rate of 5 to 10 cc/min, so that such an automatic lubrication or oiling system is best suited for use such as chain lubrication, because every chain joint may be positively lubricated, and because there results no contamination due to excessive lubrication because of a minimized feeding rate of oil. In addition, there may be achieved advantages from the use of such a lubrication system in that there arises no scattering nor non-uniform lubrication in the applications to operating members such as a wire rope, gear or the surfaces of sliding motion.

As is apparent from the foregoing, the aforesaid purposes may be attained by means of one embodiment of the lubrication system according to the present invention. However, further tests reveal that stabilization of a feeding condition of oil under a constant oil pressure dictates the limitation of $D \geq 2d_1$, wherein D represents the diameter of the passage 19 running through the nozzle 8 as shown in FIG. 3.

With the nozzle of such an arrangement, however, since the outer diameter $d_2$ of the end face of the nozzle 8 satisfies the relationship of $d_2 \leq 2d_1$, the wall thickness of the head portion 21 becomes extremely small, thus presenting difficulty in fabrication. The nozzle 8' shown in FIG. 4 overcomes this disadvantage, in which the diameter $d_1$ and length $l_1$ of the orifice, the outer diameter $d_2$ of the end face $m_1$, and the diameter D of the internal passage 19 in the body portion remain unchanged, except that the outer periphery of the head 121 is tapered at an angle $\theta$. This arrangement permits an increase in the wall thickness of the head portion 121 of the nozzle 8', thereby allowing improvements in fabrication. In this respect, if the tapered angle $\theta$ or nozzle wall angle is excessive, then oil tends to cling to the tapered outer periphery of the head portion, with the result that oil droplets hinder continuous dropping of oil in the form of a line, because the oil thus dropping tends to be attracted to the droplets formed on the tapered outer periphery of the head portion. The test results reveal that a tapered angle of the outer periphery of the head portion should preferably follow the relationship of $\theta \leq 50°$. This improves the easiness of fabrication of the nozzle to a great extent.

Figure 4:
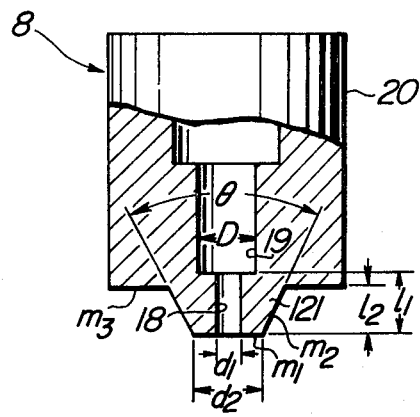
FIG. 4 is a view, partly in cross section, of a modification of the nozzle.

Meanwhile, if the length $l_2$ of the head portion 21, 121 of the nozzle 8 or 8' as shown in FIGS. 3 and 4 is excessively short, in case the nozzle is touched with a hand or waste which is wet with oil, then oil clinging to the shoulder portion $m_3$ attracts a line of oil which is dropping, thereby hindering the flow of oil which drops in the form of a continuous line, with the resulting dripping of oil. Accordingly, the length $l_2$ should be over a given length. It was found that the relationship $l_2 \geq 2$ mm insures oil dropping in the form of a continuous line, even if oil is clinging to the periphery of the head portion 12, 121.

As is apparent from the foregoing, it was found that a nozzle of a special arrangement enables dropping of oil in the form of a continuous line at a low feeding or discharge rate of 5 to 10 cc/min. In addition, it was also proved that if a spacing $h$ between the nozzle 8 or 8' and the operating member 9 as shown in FIG. 1 is increased, then there results an interruption of a continuous line of oil or dripping of oil. This phenomenon is considered that, as in the case where an object which is effecting free dropping is accelerated by gravity acceleration, oil being issued from the nozzle 8 or 8' is accelerated from a speed of oil being just discharged, so that preceding oil goes faster than succeeding oil, thereby decreasing the diameter of a flow of oil dripping in the form of a continuous line, with the eventual interruption of the line, presenting a plurality of droplets dropping one after another. The height at which oil dropping in the form of a continuous line turns into a line of droplets depends on the amount of oil being discharged through the nozzle 8 or 8' as well as the viscosity of oil. In the case of oil such as 120 $cSt$ being used as a lubricant for a chain, the test results prove that in the case of the discharge rate of oil of 5 to 10 cc/min, the height at which oil in the form of a continuous line turns into a line of droplets is about 50 mm. With the low pressure automatic lubrication system using a nozzle 8 or 8' as shown in FIGS. 3 and 4, it is imperative that the spacing $h$ between the exit of the orifice in the nozzle 8 or 8' and the operating member 9 maintain the relationship of $h \leq 50$ mm, which insures oil dropping in the form of a continuous line.

However, even in the case of such oil dropping in the form of a continuous line at a feeding rate as low as 5 to 10 cc/mm, oil will be scattered upon impingement on an operating member depending on its dropping speed. Accordingly, for achieving an oil feeding condition which is free of contamination due to excessive lubrication, it is mandatory that the spacing $h$ between the exit of the orifice 19 and the operating member 9 be decreased, thereby allowing the dropping of oil at a low acceleration. The results of a test for the oil as used for a chain indicate that the spacing $h$ between the exit of the orifice and the operating member 9 maintains the relationship of $h \leq 20$ mm for achieving oil which is dropping in the form of a continuous line without scattering, even upon impingement of the oil on the operating member 9, but rather the dropped oil clings to the surface of the member 9. As a result, for preventing contamination due to excessive lubrication, the relationship of $h \leq 20$ mm should be maintained for the operating member 9. However, if the spacing $h$ is excessively short, then there arises a possibility of a chain contacting the nozzle 8 or 8' due to its oscillation during the travel thereof. Accordingly, the spacing $h$ should preferably be over 5 mm.

Figure 5:
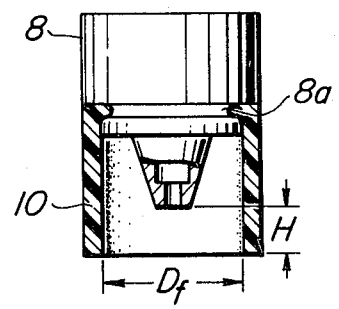
FIG. 5 is a view, partly in cross section, of the nozzle provided with a hood member.
Figure 6:
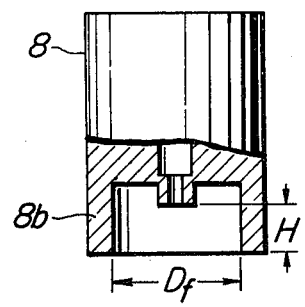
FIG. 6 is a view, partly in cross section, of a nozzle having an extended portion in place of the hood.

However, the nozzle 8 or 8' described thus far has its tip portion formed in an extremely delicate manner, so that even clinging of fine dust to the vicinity of an exit of orifice 18 causes deflection of oil dropping, or interruption of a continuous dropping, i.e., dripping of oil. FIGS. 5 and 6 show modifications of the nozzle which are so designed as to prevent clinging of such dust. As shown in FIG. 5, the nozzle 8'' is formed with an annular groove 8a, with a separate hood member 10 fitted on the annular groove 8a in a manner to be fixedly secured thereto. In addition, the nozzle 8''' shown in FIG. 6 is formed with an extended or depending portion 8b which projects from the outer periphery of the nozzle 8''' in the axial direction, while the extended portion serves as a hood member 10 of FIG. 5. Test results reveal that, in case there prevails flying dust as in the case of a conveyor, the inner diameter $D_f$ of the hood member 10 or extended portion 8b should be over 5 mm, in an attempt to prevent clinging of dust to the vicinity of the head portion by causing the dust to cling to the hood member 10 or extended portion 8b. In this manner, dust tends to cling to the vicinity of the head portion, so that the direction of the oil dropping will not be deflected nor will take place the dripping of oil in the form of a plurality of droplets.

In addition, there may be prevented a damage due to inadvertent contact of the head portion of the nozzle 8'' or 8''' upon handling of same.

Figure 7:
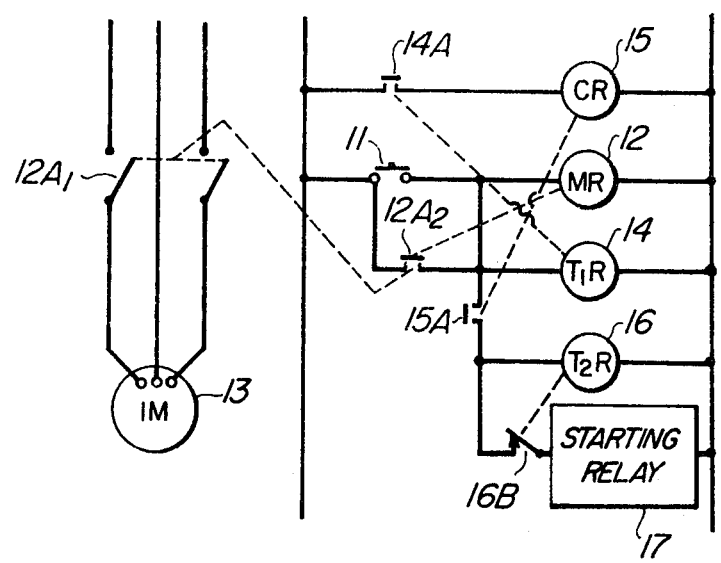
FIG. 7 is an electric circuit diagram of the automatic control means for use in the low pressure automatic lubrication system according to the present invention.

While description has been had of the low pressure automatic lubrication system, which is best suited for lubrication of a chain and the like, particularly of the arrangement of nozzle 8, 8', 8'', 8''' there is proposed another attempt to provide a control circuit for controlling an oil feeding operation in association with the operation of the operating member, thereby enhancing the effect of such a low pressure automatic lubrication system. FIG. 7 shows an example of the electric circuit diagram. As shown, an automatic return type starting switch 11 is depressed so as to energize a main relay 12. Then, main contacts $12a_1$ and $12a_2$ of the main relay 12 are closed, thereby starting a drive means 13 for the operating member 9. On the other hand, when the starting switch 11 is depressed, then a time delay 14 is energized. Thus, when a predetermined time has lapsed, the contact 14A of the time relay 14 is closed, thereby feeding a signal to a count relay 15, while the time relay 14 will be self returned. When a predetermined cycle of the count relay 15 has been accomplished by repeating the aforesaid cycle of operation, then a contact 15A of the count relay 15 is closed and a time relay 16 is actuated, so that a starting relay 17 for the lubrication system is actuated, thereby starting oiling. On the other hand, when a predetermined lubricating time has lapsed, then a contact 16B of the time relay 16 is opened so as to interrupt lubrication.

In this case, when the set time of the time relay 14 is set to one cycle of operating hours of the operating member 9 or two-thirds of the operating hours in a day, the count relay 15 is only actuated once during a cycle of operating hours of the operating member 9 or during the operating hours in a day. In addition, when a predetermined cycle of the count relay 15 has been accomplished, automatic lubrication will be carried out during the remaining one-third of operating hours of the operating member 9. Furthermore, if the time relay 16 is so set that the operating member 9 (for instance a chain) may be revolved one or two cycles positively, the local failure of lubrication may be prevented.

Meanwhile, with this automatic lubrication control circuit, automatic lubrication is effected, in case the count relay 15 is so designed as to count a predetermined cycle of operations of the operating member 9. However, in case one cycle of lubrication is effected per one cycle of operation or per operation in one day, the count relay 15 may be eliminated, while the contact 14A of the time relay 14 may be provided in the position of the contact 15A of the count relay 15. In this respect, the set time of the time relay 14 may be optionally set.

On the other hand, while the time relay 14 is used as an example for actuating the count relay 15, the actuating cycle of the starting switch 11 or that of the stopping switch for stopping the operating member 9 may be counted, alternatively.

According to one example of the automatic lubrication control circuit described, automatic lubrication may be effected during the time in which the operating member 9 is being operated, so that there may result saving in man-hours of operators as well as those required for operation of lubrication. In addition, lubrication will be automatically accomplished, so that the service life of the operating member 9 may be effectively extended. In addition, the provision of the count relay 15 may reduce the cycle of lubrication, preventing excessive lubrication.

Figure 2:
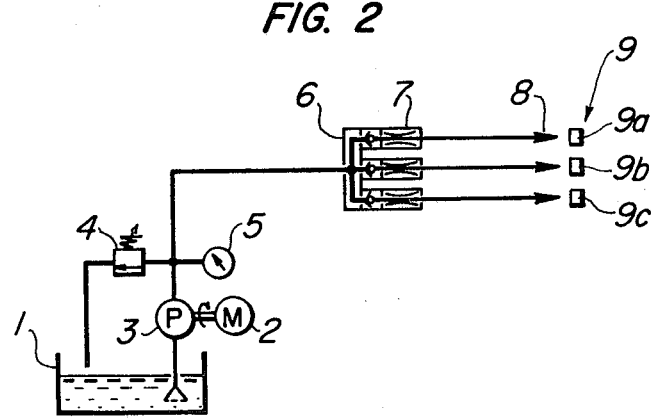
FIG. 2 is a schematic view of the system shown in FIG. 1.
Figure 8:
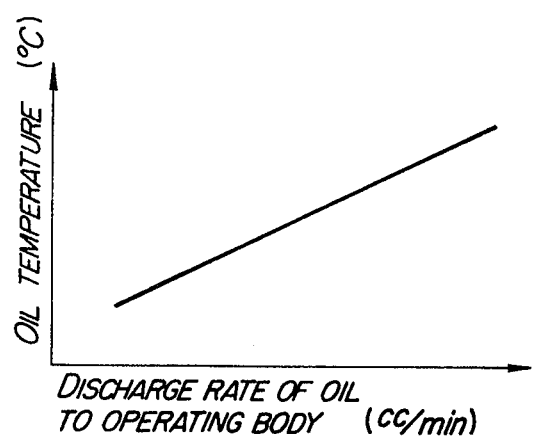
FIG. 8 is a graphical representation showing the relationship between the oil temperature and the discharge rate of oil being fed to an operating body.

The low pressure automatic lubrication system which has been described thus far uses a flow control valve 7 utilizing an orifice, and features that an internal pressure of oil varies in proportion to the discharge rate of oil being issued through the nozzle. As is well known, the viscosity of oil varies depending on temperatures, so that the discharge rate of oil through the nozzle varies with the variation in viscosity. FIG. 8 is a graphical representation of the relationship between the temperature and the discharge rate of oil running through the nozzle of the low pressure automatic lubrication system according to the present invention. Stated differently, it is shown in FIG. 8 that the discharge rate of oil varies in proportion to the variation in oil temperature. This further indicates that even if the internal pressure of oil is adjusted by means of the relief valve 4 as shown in FIG. 1 or FIG. 2, the discharge rate of oil through the nozzle varies due to the variation in ambient temperature as such in four seasons of the year i.e., spring, summer, fall and winter. With the automatic control as shown in FIG. 7, there tends to be posed problems such as excessive lubrication and insufficient lubrication, unless the relief valve 4 is adjusted commensurate to the variation in ambient temperature.

Figure 9:
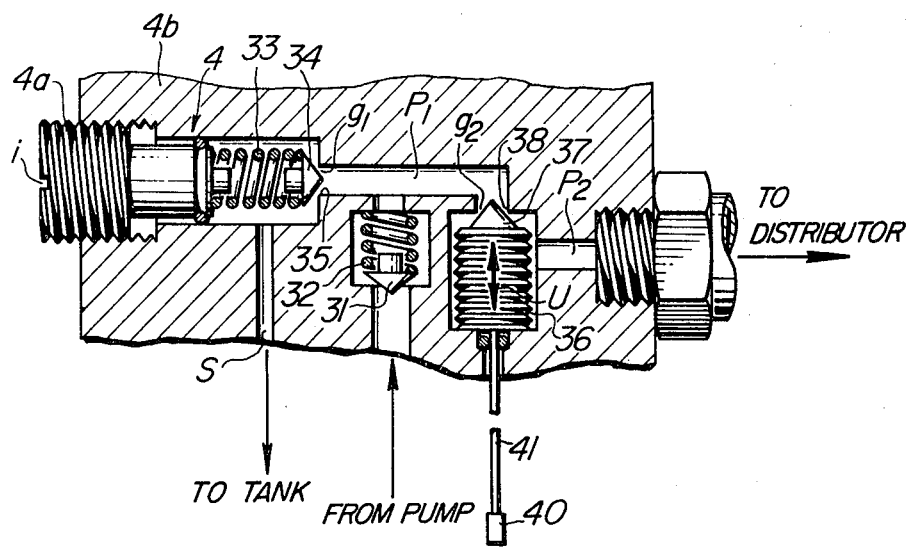
FIG. 9 is a cross-sectional view of a housing which houses a relief valve and means for adjusting the discharge rate of oil from a pump, commensurate to variation in oil temperature.

To overcome the aforesaid problems, there is proposed an automatic control means for controlling the discharge rate of oil commensurate to the variation in temperature. FIG. 9 shows an example of the automatic control means. In FIG. 9 showing the housing 4b of FIG. 1, oil which has been fed under pressure from the pump 3 lifts a check valve 31 having a spring 32 to which has been applied a constant preload, and then is fed to the side of the distributor 6. In this respect, the check valve 31 serves to prevent a reverse flow of oil upon stoppage of the pump 3. When the internal pressure $P_1$ of oil which has passed through the check valve 31 is gradually raised to a constant internal pressure $P_1$, then oil will be fed by way of the flow control valve 7 through the nozzle 8. However, if the internal pressure $P_1$ is raised to a further increased level, then the spring 33 in the relief valve 4 is urged or biased under the internal pressure $P_1$, resulting in the formation of a gap $g_1$ between a valve head 34 and a metering orifice 35, so that part of oil travels through the gap $g_1$ to be returned through a passage S to a tank 1. The gap $g_1$ in the relief valve 4 is widened with an increase in the internal pressure $P_1$ to thereby increase the amount of oil returning, thereby decreasing the internal pressure. As a result, the internal pressure $P_1$ may be maintained constant, so that the discharge rate of oil through the nozzle may be maintained constant. If the discharge rate of oil through the nozzle is desired to be increased or reduced, then a screw driver and the like is inserted into a slit $i$ in an adjusting screw 4a to thereby rotate the screw 4a in an attempt to adjust a set load or pressure on the spring 33. This causes the valve head 34 to be retracted commensurate to the adjustment, thus varying the discharge rate of oil through the nozzle. However, under such a condition, the viscosity of oil varies with the variation in oil temperature, so that the discharge rate of oil through the nozzle varies in a manner as shown in FIG. 8. In the light of such a condition, there is proposed an actuating body 36 which may be compressed and extended depending on the variation in temperature, and which is positioned in the course of a flow of oil, in an attempt to maintain the discharge rate of oil constant, irrespective of the variation in oil temperature, with the result that a gap $g_2$ between the metering orifice 38 and a head 37 of the actuating body 36 may be varied in response to the aforesaid compression and extension of the actuating body 36. The actuating body 36 may be made of a bellows, while a temperature sensing portion 40 adapted to detect the variation in oil temperature is positioned within the tank or close to the tank 1, so that the variation in temperature thus detected may be transmitted by way of a lead pipe 41 to the actuating body 36, thereby causing the actuating body 36 to be compressed or extended in a direction indicated by an arrow U. As a result, the gap $g_2$ between the valve head 37 and the metering orifice 38 is narrowed, thereby presenting an increase in frictional resistance of the flow of oil, with the result that the internal pressures $P_1$ and $P_2$ upstream and downstream of the actuating body 36 are varied in a manner that the internal pressure $P_1$ becomes higher than the internal pressure $P_2$. Then the internal pressure $P_1$ higher than $P_2$ acts on the relief valve 4, thereby increasing the amount of oil returning to the tank 1 so as to lower the internal pressure $P_1$ to the level of the internal pressure $P_2$.

Figure 10:
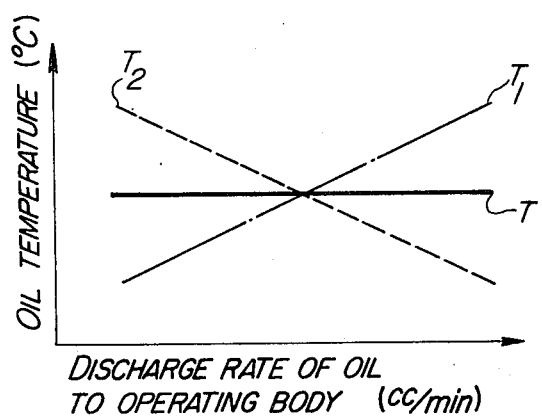
FIG. 10 is a graphical representation similar to FIG. 8.

The provision of the actuating body 36 which tends to be compressed or extended with variation in temperature varies the discharge rate of oil through the nozzle as shown in FIG. 10. More particularly, a line $T_1$ represents the same as that shown in FIG. 8, representing the discharge rate of oil at a constant internal pressure $P_1$, in the absence of the actuating body 36 and the valve head 37. On the other hand, a line $T_2$ represents the amount of oil returning to the tank 1, when the actuating body 36 is extended or compressed commensurate to the variation in oil temperature to thereby vary the internal pressure $P_1$ due to the variation in frictional resistance of oil flow, which resistance is caused by the gap $g_1$ between the valve head 37 and the metering orifice 38. The coefficient of thermal expansion of the actuating body 36 as well as the gap $g_2$ between the valve head 37 and the metering orifice 38 are selected in inverse proportion to the line $T_1$. As a result, the discharge rate of oil through the nozzle, in case of use of the actuating body 36 and valve head 38, may be maintained constant as shown by the line T, irrespective of the variation in oil temperature.

Thus, throughout the four seasons of the year, the discharge rate of oil to the actuating body 9 may be maintained constant relative to the variation in atmospheric temperature in seasons, so that excessive lubrication and insufficient lubrication may be avoided, and in addition adjustment by the adjusting screw 4a for the variation in temperature is no longer required, thereby presenting an advantage of saving man-hours of operators.

Meanwhile, as far as oil of a constant viscosity is used in this embodiment, the discharge rate of oil will be such as shown by the line T. Thus, the adjusting screw 4a may be fixed rigidly, with the spring 33 being so adjusted that the optimum feeding rate of oil may result, say, in the range of 5 to 10 cc/min. However, if oil having different viscosity is used, then the discharge rate of oil through the nozzle varies due to the different viscosity of oil, and thus the spring pressure of spring 33 should be selected so as to give an optimum discharge rate of oil. Accordingly, the provision of the adjusting screw 4a on the relief valve 4 as shown in FIG. 9 brings about an advantage in that the initial adjustment of the discharge rate of oil is possible even in the case of the use of oil having different viscosity. While the actuating body 36 is positioned between the pump 3 and the distributor 6, the actuating body 36 may be built in the relief valve 4 in a manner that the gap $g_1$ between the valve head 34 of the relief valve 4 and the metering orifice 35 may be varied, with the result of the eventual achievement of the discharge rate of oil as shown in FIG. 10. As is apparent this alteration falls within the scope of the present invention. In addition, although the actuating body 36 made of bellows and the like, which may be compressed or extended, is used, the same results may be obtained by directly using a bimetal or a member whose length or diameter of hole may be varied depending on the temperature variation or by indirectly using an enlarging mechanism, within the scope of the present invention.

As is apparent from the foregoing description of the low pressure automatic lubrication system according to the present invention, a very small amount of oil may be dropped in the form of a continuous line at a discharge rate of 5 to 10 cc/min, so that a lubricating condition optimum for a chain, wire rope or gear may be achieved, thereby presenting extended service lives or performances of these drive members for a long period of time, while saving man-hours required for lubrication to a great extent.

What is claimed is:

1. A low pressure automatic lubrication system of the type which feeds oil to at least one operating body at a low pressure for lubrication, comprising:
   a pump;
   nozzle having at its one end a circular end face and including an orifice, one end of said orifice being open to said circular end face, oil pumped by said pump means being fed through said orifice to said operating body; and
   control means positioned between said pump and said nozzle means for controlling the flow of oil from said pump to said nozzle means; said orifice having a diameter $d_1$ and a length $l_1$, and said circular end face of said nozzle means having an outer diameter of $d_2$, wherein $d_1 = 0.3$ mm to 0.8 mm, $d_2 \leq 2d_1$, and $l_1 \leq 6d_1$, and said nozzle means has a passage connected to the other end of said orifice, said passage having a diameter D which satisfies the relationship of $D > 2d_1$.

2. A low pressure automatic lubrication system of the type which feeds oil to at least one operating body at a low pressure for lubrication, comprising:
   a pump;
   nozzle means having at its one end a circular end face and including an orifice, one end of said orifice being open to said circular end face, oil pumped by said pump being fed through said orifice to said operating body; and
   control means positioned between said pump and said nozzle means for controlling the flow of oil from said pump to said nozzle means;
   said orifice having a diameter $d_1$ and a length $l_1$, and said circular end face of said nozzle means having an outer diameter of $d_2$, wherein $d_1 = 0.3$ mm to 0.8 mm, $d_2 \leq 2d_1$, and $l_1 \leq 6d_1$, said nozzle means has a passage connected to the other end of said orifice, said passage having a diameter D which satifies the relationship of $D > 2d_1$, and a hood member surrounding said circular end face to which the one end of said orifice is open, to prevent the dust from clinging to the one end of said orifice.

3. A low pressure automatic lubricating system comprising:
   pump means for pumping a lubricating oil;
   at least one nozzle having an orifice, a circular end surface to which one end of said orifice opens, and a passage connected to the other end of said orifice; and
   value means positioned between said pump means and said nozzle for controlling the flow of the lubricating oil fed from said pump means to said nozzle;
   the lubricating oil being delivered under pressure by said pump means through said valve means to said nozzle to be discharged therefrom in the form of a continuous stream toward at least one point to be lubricated;
   wherein said orifice has a diameter of 0.3 to 0.8 mm, said circular end surface has an outer diameter of most twice the diameter of said orifice; said orifice has a length at most of six times the diameter of said orifice, and said passage has a diameter of more than twice the diameter of said orifice.

4. A low pressure automatic lubrication system as set forth in claim 3, wherein said nozzle means has an outer periphery tapered at an angle of $\theta$ which satisifes the relationship of $\theta \leq 50°$, said outer periphery extending from the end of said orifice to the other end thereof.

5. A low pressure automatic lubrication system as set forth in claim 3, wherein said nozzle means has an outer periphery extending from said circular end face to which said one end of said orifice is open, to the other end of said orifice, over the length of $l_2$ which satisfies the relationship of $l_2 \geq 2$ mm.

6. A low pressure automatic lubrication system as set forth in claim 3, wherein a spacing between the one end of said orifice and said operating body is 5 to 50 mm.

7. A low pressure automatic lubrication system as set forth in claim 3, wherein a spacing between one end of said orifice and said operating body is 5 to 20 mm.

8. A low pressure automatic lubriction system as set forth in claim 3, wherein said system further comprises a control circuit for controlling a lubricating operation in association with the operation of said operating body, said control circuit including a time relay for measuring the operating time after the starting of said operating body, a starting relay actuated upon actuation of said time relay after the lapse of a given time, and a time relay for stopping said starting relay after the lapse of a given time, whereby oil may be fed from said pump to said operating body according to the actuation of said starting relay.

9. A low pressure automatic lubrication system as set forth in claim 8, wherein said control circuit includes a count relay counting the operating cycles of said operating body, so that when the operating cycles reach given cycles, said starting relay may be actuated.

10. A low pressure automatic lubrication system a set forth in claim 3, wherein said system further comprises means positioned between said pump and said oil flow control means for adjusting the feeding rate of oil for said operating body commensurate to the variation in oil temperature.

11. A low pressure automatic lubrication system as set forth in claim 10, wherein said oil feeding rate control means includes a metering orifice, a detector for producing a signal in response to the variation in temperature, and means retractable in response to said signal from said detector to adjust the opening of said metering orifice.

12. A low pressure automatic lubrication system as set forth in claim 3, wherein said system includes a relief valve, manually adjusting the pressure of oil being fed under pressure from said pump.

13. A low pressure automatic lubricating system as set forth in claim 3, wherein said nozzle has a tip having an outer periphery thereof outwardly tapered at an angle of at most 50°.

14. A low pressure automatic lubricating system as set forth in claim 3, wherein said nozzle has an outer periphery thereof extending from said circular end face to which said one end of said orifice opens, toward the other end of said orifice, over the length of at least two millimeters, said length of the outer periphery of said nozzle being less than the length of said orifice.

* * * * *